(12) United States Patent
Zhang (10) Patent No.: US 9,594,518 B2
(45) Date of Patent: Mar. 14, 2017

(54) METHOD, APPARATUS AND SYSTEM FOR CONTROLLING QUALITY OF SERVICE OF STORAGE SYSTEM

(71) Applicant: Huawei Technologies Co., Ltd., Shenzhen, Guangdong (CN)

(72) Inventor: Dong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 515 days.

(21) Appl. No.: 13/904,776

(22) Filed: May 29, 2013

(65) Prior Publication Data

US 2013/0268738 A1  Oct. 10, 2013

Related U.S. Application Data

(63) Continuation of application No. PCT/CN2012/079539, filed on Aug. 2, 2012.

(30) Foreign Application Priority Data

Oct. 31, 2011 (CN) .......................... 2011 1 0337131

(51) Int. Cl.
*G06F 12/00* (2006.01)
*G06F 3/06* (2006.01)

(52) U.S. Cl.
CPC ............ *G06F 3/0619* (2013.01); *G06F 3/061* (2013.01); *G06F 3/067* (2013.01); *G06F 3/0649* (2013.01)

(58) Field of Classification Search
CPC ...... G06F 3/0619; G06F 3/0649; G06F 3/061; G06F 3/067
See application file for complete search history.

(56) References Cited

U.S. PATENT DOCUMENTS 7,225,211 B1  5/2007  Colgrove et al.
8,010,738 B1 * 8/2011  Chilton ................ G11C 16/349
                                                 711/103

(Continued)

FOREIGN PATENT DOCUMENTS

CN  1766885 A  5/2006
CN  1952941 A  4/2007

(Continued)

OTHER PUBLICATIONS

International search report and written opinion issued in corresponding PCT application No. PCT/CN2012/079539, dated Nov. 15, 2012, total 12 pages.(Chinese).

*Primary Examiner* — Reginald Bragdon
*Assistant Examiner* — Hannah A Faye-Joyner
(74) *Attorney, Agent, or Firm* — Leydig, Voit & Mayer, Ltd.

(57) ABSTRACT

The present invention provides a method, an apparatus, and a system for controlling quality of service of a storage system. The method includes: identifying a target data object; acquiring a storage address of the target data object stored in a storage device by searching a file system of the host, wherein the file system contains data mapping the data object to the storage address of the target data object; and sending the storage address to the storage device to instruct the storage device to perform quality of service control on access to the target data object at the storage address. The present invention solves the problems of resource waste and lower quality of service in a QoS control manner, and can satisfy user requirements more accurately.

8 Claims, 3 Drawing Sheets

(56) References Cited

U.S. PATENT DOCUMENTS

| | | |
|---|---|---|
| 2006/0010169 A1 | 1/2006 | Kitamura |
| 2006/0095664 A1 | 5/2006 | Wichelman et al. |
| 2006/0112155 A1 | 5/2006 | Earl et al. |
| 2007/0083482 A1 | 4/2007 | Rathi et al. |
| 2009/0228535 A1 | 9/2009 | Rathi et al. |
| 2011/0197027 A1 | 8/2011 | Balasubramanian et al. |
| 2011/0258378 A1 | 10/2011 | Ananthanarayanan et al. |
| 2012/0016916 A1* | 1/2012 | Xia .................. G06F 17/30067 707/827 |

FOREIGN PATENT DOCUMENTS

| | | |
|---|---|---|
| CN | 101527736 A | 9/2009 |
| CN | 101819543 A | 9/2010 |
| CN | 102147709 A | 8/2011 |
| CN | 102426552 A | 4/2012 |

* cited by examiner

METHOD, APPARATUS AND SYSTEM FOR CONTROLLING QUALITY OF SERVICE OF STORAGE SYSTEM

This application is a continuation of International Application PCT/CN2012/079539, filed on 2 Aug. 2012, which claims priority to Chinese Patent Application No. 201110337131.5, filed with the Chinese Patent Office on Oct. 31, 2011 and entitled "Method, Apparatus and System for Controlling Quality of Service of Storage System", which is hereby incorporated by reference in its entirety.

FIELD OF THE INVENTION

The present invention relates to storage technologies, and in particular, to a method, an apparatus, and a system for controlling quality of service of a storage system.

BACKGROUND OF THE INVENTION

Data in a host is usually stored in a storage system. When needing to access a certain data object in the host, for example, a data address or a file corresponding to a certain application program, the host accesses the storage system to acquire data, in the storage system, corresponding to the object. When processing an access request of the host, the storage system allocates certain system resources for current access, where the system resources of the storage system may include, for example, a memory, a CPU and so on. A control module in the storage system adjusts system resources occupied by access to each object, so that the access to each object has different quality of service, for example, different bandwidth and different delays. The procedure of adjusting access service performance by adjusting the occupied system resources is called quality of service (Quality of Service, QoS for short) control.

In the prior art, QoS control of the storage system generally adopts a QoS control manner with a granularity level of a logic unit number (logic unit number, LUN for short). Specifically, the storage system includes a plurality of LUNs. The LUN is a virtual storage unit of the storage system. Data is stored in an address range corresponding to the LUN, and the data stored in the address can be acquired by accessing the address. The control module in the storage system can perform QoS control on the whole LUN in a unit of LUN. For example, if file A in the host is stored in LUN2, QoS of a high level can be given to the whole LUN2, so that quality of access to file A is high.

The technical disadvantage existing in the QoS control in the prior art is as follows: As mentioned in the foregoing, the storage system gives QoS of a high level to I/O access to all addresses of the whole LUN2, but the host only accesses data in a certain part of the addresses (an address corresponding to file A) in the LUN2, so performing the QoS control on all addresses of the whole LUN wastes the system resources of the storage system; moreover, the system resources are limited, and if too much resources are allocated to a certain LUN, resources allocated to other LUNs are inevitably reduced, which may affect the access quality of the data in the other LUNs. Thus, the existing QoS control manner has the problems of resource waste and lower whole quality of service.

SUMMARY OF THE INVENTION

The present invention provides a method, an apparatus, and a system for controlling quality of service of a storage system, so as to save system resources of the storage system and improve the quality of service of the storage system.

The present invention provides a method for controlling quality of service of a storage system, including:

acquiring a preset data object, and acquiring a storage address, in a storage device, corresponding to the data object according to the preset data object, where the data object includes an application program or a file, and the acquiring the storage address, in the storage device, corresponding to the data object includes: acquiring the storage address, in the storage device, corresponding to the data object stored in a file system by searching the file system; and sending the storage address to the storage device, so that the storage device performs quality of service control on access to the storage address.

The present invention provides a host, including:

an address identifying unit, configured to acquire a preset data object, and acquire a storage address, in a storage device, corresponding to the data object according to the preset data object, where the data object includes an application program or a file, and the acquiring the storage address, in the storage device, corresponding to the data object includes: acquiring the storage address, in the storage device, corresponding to the data object stored in a file system by searching the file system; and an address sending unit, configured to send the storage address to the storage device, so that the storage device performs quality of service control on access to the storage address.

The present invention provides a system for controlling quality of service of a storage system, including a host and a storage device, where the host is configured to acquire a preset data object, acquire a storage address, in the storage device, corresponding to the data object according to the preset data object, and send the storage address to the storage device, where the data object includes an application program or a file, and the acquiring the storage address, in the storage device, corresponding to the data object includes: acquiring the storage address, in the storage device, corresponding to the data object stored in a file system by searching the file system; and the storage device is configured to perform quality of service control on access to the storage address.

In the method, the apparatus, and the system for controlling the quality of service of the storage system, the storage address, in the storage device, corresponding to the data object is acquired, so that the storage device performs the QoS control on the access to the storage address only, but does not need to perform control on the whole LUN, which is unlike the prior art, thereby solving the problems of resource waste and lower quality of service in a QoS control manner, saving the system resources of the storage system, improving the quality of service of the storage system, and satisfying user requirements more accurately.

BRIEF DESCRIPTION OF THE DRAWINGS

To describe the technical solutions in embodiments of the present invention or in the prior art more clearly, the following briefly introduces the accompanying drawings required for describing the embodiments.

DETAILED DESCRIPTION OF THE EMBODIMENTS

To make objectives, technical solutions, and advantages of embodiments of the present invention more comprehensible, the following clearly describes the technical solutions in the embodiments of the present invention with reference to the accompanying drawings in the embodiments of the present invention.

Figure 1:
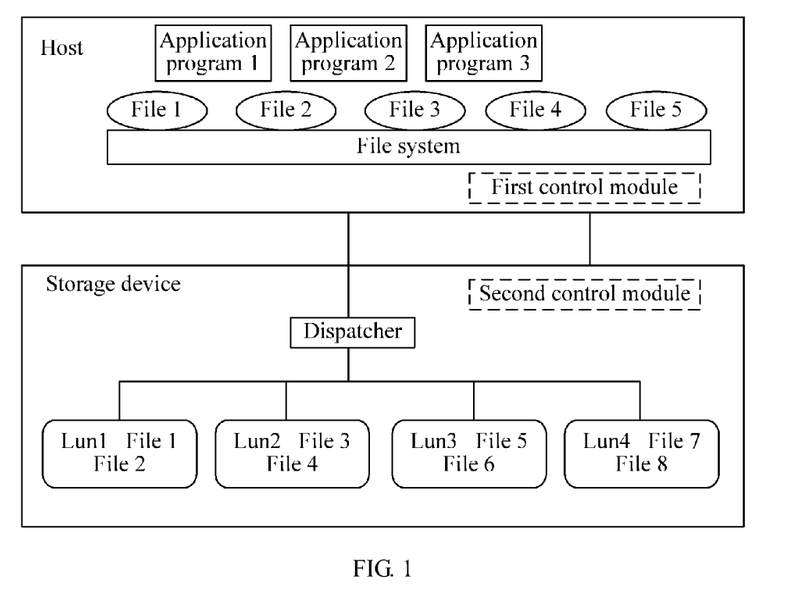
FIG. 1 is a structural diagram of a system applied in a method for controlling quality of service of a storage system according to an embodiment of the present invention.

A method, an apparatus, and a system for controlling quality of service of a storage system according to embodiments of the present invention are applicable to a SAN storage system. In order to describe a method for controlling quality of service of a storage system according to an embodiment of the present invention more clearly in the following, a system applied in the present invention is briefly introduced first. FIG. 1 is a structural diagram of a system applied in a method for controlling quality of service of a storage system according to an embodiment of the present invention. As shown in FIG. 1, access to data is implemented through communication between a host and a storage device. The storage device may be, for example, a disk array. A host operating system includes a file system. The file system is used to organize and manage files in the host. Data corresponding to the files is actually stored in the storage device. A function of the file system is to uniformly manage files and directories, and a mapping relationship between the files and directories, and storage addresses in the storage device. For example, if a certain application program in the host operating system intends to access file A, the file system may find, according to an access request of a user, a storage address of file A in the storage device, and then send an I/O request to the storage device to acquire data of file A, where the request carries the address. The storage device generally includes a plurality of LUNs. Data, such as an application program and a file, in the host is stored in the LUNs. A dispatcher in FIG. 1 is configured to allocate the I/O request sent by the host to a corresponding LUN for processing.

Based on this, the following describes the technical solutions of the embodiments of the present invention.

Embodiment 1

Figure 2:
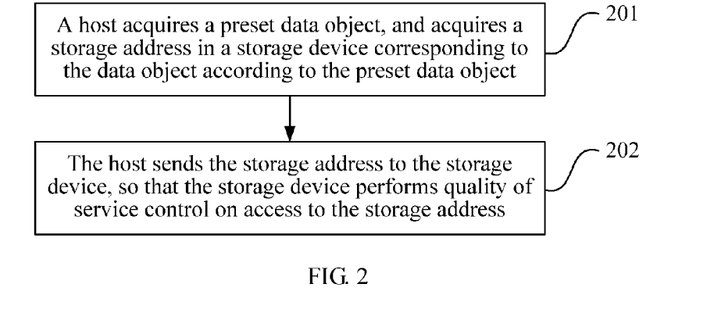
FIG. 2 is a schematic flow chart of a method for controlling quality of service of a storage system according to an embodiment of the present invention.

FIG. 2 is a schematic flow chart of a method for controlling quality of service of a storage system according to an embodiment of the present invention. The method for controlling the quality of service of the storage system of this embodiment may be executed by a host. As shown in FIG. 2, the method may include the following steps:

201: A host acquires a preset data object, and acquires a storage address in a storage device corresponding to the data object according to the preset data object.

The preset data object may be configured by a user in a host before the host accesses the storage device, and may also be sent by the storage device to the host after being configured by the user in a storage device. The data object refers to, for example, any address-designated area accessed by a certain application program, or a certain file/directory, and may be configured specifically according to user requirements; or, the user may not designate a specific application program or file, but only configure a hot data object (for example, a hot data file), and then the host analyzes which is the hot data object. The hot data object refers to an object having a high access frequency. In that case, the host may preset an access frequency threshold (for example, the number of times of access per day). For example, if the number of times of access to a certain file is too large and reaches the threshold, the file may be determined as a hot data file.

A storage address, in the storage device, corresponding to a data object of a file/directory may be acquired from, for example, the file system of the host. The file system generally stores an organization directory of data objects such as all files in the host and a storage address, in the storage device, corresponding to the data object. For example, file A is stored in an address space a~b in LUN2 of the storage device; the host can search records of the file system to obtain a storage address of a data object selected by the user. Any address accessed by the application program may be acquired by using an independent monitoring program to continuously monitor an address of any I/O access that is initiated by a corresponding application program process and directed to a bottom layer. An IO target may be one file or multiple files or directories in the file system, and may also be a raw device address.

202: The host sends the storage address to the storage device, so that the storage device performs quality of service control on access to the storage address.

Because a minimum object perceptible by a SAN storage system is an LUN and the storage system cannot perceive a file system organization inside the LUN, the storage system cannot perceive, for example, an address segment, in the LUN, corresponding to a single file. In the embodiment of the present invention, if QoS control is to be performed on the file, a host identifies address information of the data object and then notifies the storage system of the address information, so that the storage system perceives a corresponding address segment.

After the host sends the storage address of the data object acquired in 201 to the storage device, the storage device can perform QoS control for only the storage address.

For example, a data object selected by the user is file A, data of file A is stored in LUN2, a plurality of files is stored in the LUN2, and the data of file A occupies only a part of an address space of the LUN2. A storage address corresponding to file A and acquired by the host is an address space a~b in the LUN2. The storage device can perform QoS control for the address space a~b only. For that purpose the storage device needs to allocate specific system resources of the storage system to only the address space a~b, but does not need to perform the QoS control on all addresses of the whole LUN2, which is unlike the prior art, thereby saving system resources of the storage system. The storage system can allocate the rest of the system resources to other LUNs, improving quality of service of data access in the other LUNs.

In the method for controlling the quality of service of the storage system of this embodiment, the storage address, in the storage address, corresponding to the data object is acquired, so that the storage device performs the QoS control on the access to only the storage address, but does not need to perform control on the whole LUN, which is unlike the prior art, thereby solving the problems of resource waste and lower quality of service in a QoS control manner, saving the system resources of the storage system, and improving the quality of service of the storage system.

Embodiment 2

Figure 3:
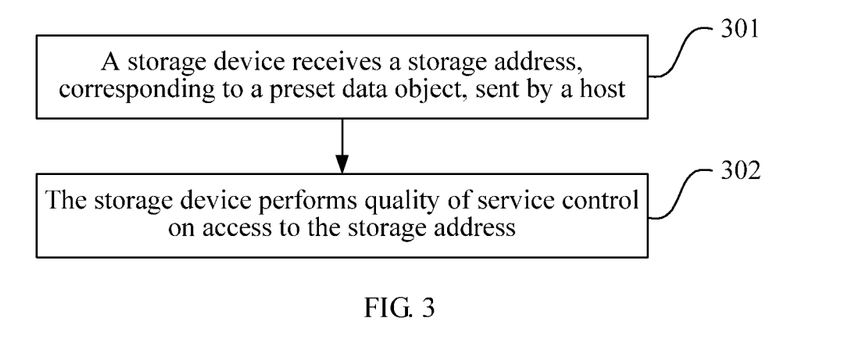
FIG. 3 is a schematic flow chart of a method for controlling quality of service of a storage system according to another embodiment of the present invention.

FIG. 3 is a schematic flow chart of a method for controlling quality of service of a storage system according to another embodiment of the present invention. The method for controlling the quality of service of the storage system of this embodiment may be executed by the storage device. As shown in FIG. 3, the method may include the following steps:

301: A storage device receives a storage address, corresponding to a preset data object, sent by a host.

For a procedure that the host acquires the storage address corresponding to the data object, refer to the description of the embodiment shown in FIG. 2, and therefore the procedure is not described herein again. For example, a data object selected by a user is file A, data of file A is stored in LUN2, a plurality of files is stored in the LUN2, and the data of file A only occupies a part of an address space of the LUN2. The host acquires a storage address corresponding to file A, which is in this example an address space a~b in the LUN2, and sends the storage address to the storage device.

302: The storage device performs quality of service control on access to the storage address.

After receiving the storage address in 301, the storage device performs QoS control for the storage address only. To do so, the storage device needs to allocate a system resource of the storage system to only the address space a~b, but does not need to perform the QoS control on all addresses of the whole LUN2, which is unlike the prior art, thereby saving system resources of the storage system. The storage system can allocate the rest of the system resources to other LUNs, improving the quality of service of data access in the other LUNs.

In the method for controlling the quality of service of the storage system of this embodiment, the storage address, in the storage device, corresponding to the data object is received, the QoS control is performed on the access to the storage address only, and it is not required that the control can be performed on the whole LUN only, which is unlike the prior art, thereby solving the problems of resource waste and lower quality of service in a QoS control manner, saving the system resources of the storage system, and improving the quality of service of the storage system.

Embodiment 3

Figure 4:
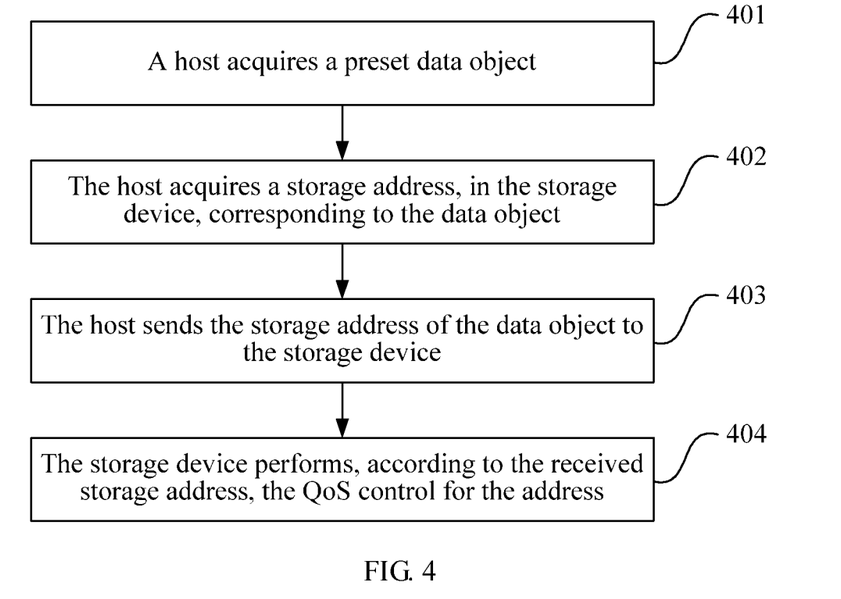
FIG. 4 is a schematic flow chart of a method for controlling quality of service of a storage system according to another embodiment of the present invention.

FIG. 4 is a schematic flow chart of a method for controlling quality of service of a storage system according to another embodiment of the present invention. This embodiment describes, in detail, a process in which communication between a host and the storage device completes QoS control on data access. As shown in FIG. 4, the method may include the following steps:

401: A host acquires a preset data object.

The method of this embodiment may be executed specifically by a first control module (referring to FIG. 1) in the host. The first control module is a function module added in the host in the prior art. By adding the module, the host can execute the method described in this embodiment. According to user requirements, a user may manually start the first control module or enable the module to automatically start, according to a preset policy, to execute the QoS control method of this embodiment.

In this step, the host may receive a configuration parameter of the user, where the configuration parameter includes a data object selected by the user on which QoS control needs to be performed. The data object includes, but is not limited to, a certain LUN, a certain application program in the host, and a certain file/directory. For example, if the user needs to perform performance adjustment on access to file A in the host, file A may be designated as the data object on which the QoS control needs to be performed.

Moreover, the user may also not specifically designate an application program or a file, but directly selects a hot data object (for example, a "hot data file"). For example, in practical use, the user may use a plurality of files, but only a part of the files are used more frequently, and the user temporarily cannot determine which file is used most frequently. In this case, the user may configure the data object on which the QoS control needs to be performed as a "hot data file". In subsequent steps, the host may perform analysis to determine which file is the hot data file. Improving quality of service QoS of access to a hot data object is an important factor of improving the whole quality of service of the storage system.

Further, apart from three objects of the file/directory, application, hot data, a host may also select to perform QoS control on "metadata of the file system". In the metadata of the file system, that a certain file of the file system is stored in a certain address segment in the storage device is recorded. The metadata is also stored in the storage device. The host usually notifies the storage device of an address corresponding to the metadata. The storage device reads the metadata from the address and sends the metadata to the file system. The file system acquires a storage address corresponding to a specific file through the metadata and notifies the storage device of performing read/write on the file address. In this embodiment, the host may parse a bottom layer address, corresponding to the metadata, in the file system, notify the storage device of the address corresponding to the metadata and meanwhile inform the storage device that data corresponding to the address is the metadata, and instruct the storage device to perform QoS control of the highest level on read/write of the metadata, for example, configuring a highest priority. Correspondingly, the QoS control on the read/write of the metadata may be configured by the user in the host, so that careful QoS control is performed on the address of the metadata. The QoS control on the access to the metadata of the file system can significantly improve the efficiency of the processing, such as searching of the system for the address.

Further, in this step, in addition to the preset data object, the host may acquire a QoS control policy that is preconfigured by the user and is corresponding to the selected data object. The QoS control policy may include, for example, a priority of an object, where each object may have a different priority and access to an object with a high priority may be preferentially processed in the storage device; a time period when the control on the QoS of the object is triggered, where a plurality of time periods may be configured and a different QoS policy is executed in each time period; and a performance value of an object in each QoS time period, where the performance value includes, for example, input/output (I/O) operations per second (Input/Output Operations Per Second, IOPS for short), bandwidth, and a delay. It may also be configured that the QoS control is triggered when a specific performance requirement (for example, the IOPS or the bandwidth) threshold arrives.

Optionally, in this embodiment, the user may also configure the data object and the QoS control policy in the storage device, and after receiving the foregoing information configured by the user, the storage device may send the information to the host. For example, the storage device may notify the host of the data object selected by the user.

402: The host acquires a storage address, in the storage device, corresponding to the data object.

After the host acquires the data object selected by the user in 401, in this step, the storage address, in the storage device, corresponding to the data object is identified, so that the storage device may subsequently perform careful QoS control for the address.

For example, if the preset data object is an application program or a file, the host monitors any bottom layer address segment accessed by the designated application program and performs statistic collection and classification regularization, so as to obtain an available bottom layer address segment accessed by the application program, or searches the file system to acquire the storage address, in the storage device, corresponding to the preset data object. For example, by searching the file system, the host may obtain the information that that file A is stored in an address space a~b in LUN2 of the storage device.

For example, if the preset policy is "monitoring a hot data file", the host needs to analyze which file is a hot data file first, and then acquire a storage address corresponding to the hot data file. Specifically, the host may preset an access frequency threshold (for example, the number of times of access per day), monitor access conditions of a plurality of files in the file system, and acquire a file of which an access frequency reaches a preset value and uses such file as a hot data file. Then, the host searches the file system to obtain a storage address, in the storage device, corresponding to the hot data file.

In the prior art, when the user configures a QoS control policy of the storage device, an LUN is a minimum unit of the control, and the user can only know in which LUN a data object on which the user intends to perform QoS control, for example, a certain file, is stored, but cannot know a specific storage address of the file in the LUN, so the QoS control can only be performed on the whole LUN; while in this embodiment, the first control module is added in the host, so that the host can acquire, according to the data object selected by the user, the specific storage address of the object in the storage device, or acquire a hot spot storage address corresponding to the hot data, thereby obtaining a basis for performing the QoS control only on the storage address, which is beneficial to the saving and efficient use of system resources of the storage device.

Further, in a practical use procedure, a storage attribute of the data object may be changed, where the storage attribute includes a data amount and a data position that are included in the data object. For example, a bottom layer data address-designated area accessed by the application program may be changed (may be called the change of the data position), or a size of a corresponding file may be changed (may be called the data amount). The foregoing change of the data object inevitably causes the storage address of the data object in the storage device to change. In this case, the host needs to acquire the changed storage address and notify the storage device, so that the storage device changes the controlled address in time, so as to perform the QoS control on the data object more accurately.

Specifically, the host may monitor, for example, whether a file list accessed by the application program each time, a raw device address-designated area, or a size of a file is changed or is modified. When the application program or the file is changed, the change is usually recorded and saved by the file system. For example, file A is modified at 10:05, the size is increased from an original size of 1 M to a current size of 1 G, and the storage address is extended from the original address space a~b in the LUN2 to a current address space a-c, which are all saved by the file system. The host may monitor the change of the data objects, and acquire, when the objects change, an up-to-date storage address and notify (but may not necessarily notify in real time and synchronously) the storage device. Similarly, the monitoring of the hot data file is also performed in the same way. For example, an original hot data file may be file A, but recently an access frequency of file B is greater than that of file A, so file B may be an up-to-date hot data file. The host notifies the storage device of an up-to-date control address to be controlled, which in this example is a storage address of file B. In order to reduce the influence on the performance of the storage device and ensure the availability of the storage device, in an aspect of monitoring the change of the data object, the host generally does not notify an external storage system of the changes in real time, so as to avoid increasing the load of the storage device. A periodical monitoring manner may be used.

Further, if the host acquires a preset QoS control policy corresponding to the data object besides the preset data object in 401, after acquiring the storage address of the data object, the host also needs to obtain, according to the storage address and the QoS control policy, a QoS control instruction; if the host only acquires the preset data object in 401 and the QoS control policy is configured in the storage device, a procedure of obtaining the QoS control instruction according to the storage address and the QoS control policy is executed in the storage device. In the following, description is given by using that the host executes the foregoing procedure of obtaining the QoS control instruction as an example.

Specifically, for example, a data object selected by the user is file A, and a preset QoS control policy includes: "a priority of file A is high", "a first QoS policy is executed at 10:00 to 15:00 and a second QoS policy is executed at 16:00 to 18:00", "the IOPS of the first QoS policy is 30, and the IOPS of the second QoS policy is 4000". The host checks the time according to the object and the control policy, and knows that the current time is 14:00 and that the first QoS policy should be executed, so the host can obtain the following QoS control instruction "the priority of file A is high, the first QoS policy is executed, and the IOPS is 30". The foregoing is only an illustration. In specific implementation, the content and generation manner of the QoS control policy and instruction may be changed according to actual requirements.

403: The host sends the storage address of the data object to the storage device.

The host may send the storage address of the data object to the storage device in an in-band or out-band manner. If the host generates the QoS control instruction in 402, both the storage address and the QoS control instruction are sent to the storage device, so that the storage device performs, according to the quality of service control instruction, quality of service control on access to the storage address. For example, the host sends "the address space a~b in LUN2, the priority is high, and the IOPS is 30".

404: The storage device performs, according to the received storage address, the QoS control for the address.

The method of this embodiment may be specifically executed by a second control module (referring to FIG. 1) in the storage device. The second control module may be a function module obtained by improving the original control module in the storage device, for example, an array controller of a disk array.

After receiving the storage address sent by the host, the storage device performs the QoS control on the access to the storage device. To that end, the storage device allocates a system resource for the corresponding QoS control on an I/O processing when the I/O request for the storage address is received again. Also, the storage device may need to adjust parameters such as a CPU, an I/O priority, a cache (CACHE) resource, a queue depth, the number of queues, and a concurrency level. A specific adjustment method may be a method common in this field and is not be limited herein. The QoS control may be performed, for example, according to the quality of service control instruction sent by the host and received by the storage device.

Moreover, the storage system generally also monitors the condition of object access performance, so as to provide a basis for a control direction of the resource. For example, the storage address and the QoS control instruction received by the storage device are "the address space a~b in LUN2, the priority is high, the IOPS is 3000". In the procedure of performing the QoS control for the storage address according to the instruction, it is detected that the current IOPS of the access corresponding to the address is 2300. It means that the object access performance does not reach a target set in the QoS control instruction, and the storage device continues to adjust system resources allocated to the access corresponding to the address, for example, increasing an occupancy percentage of the CPU until a preset performance target that the IOPS is 3000 arrives. However, a threshold of a resource allocated to the object should exist, and unlimited allocation is not allowed.

In the method for controlling the quality of service of the storage system of this embodiment, the storage address, in the storage device, corresponding to the data object is acquired, so that the storage device performs the QoS control on the access to the storage address only, but does not need to perform control on the whole LUN, which is unlike the prior art, thereby solving the problems of resource waste and lower quality of service in a QoS control manner, saving the system resources of the storage system, improving the quality of service of the storage system, and satisfying user requirements more accurately.

Embodiment 4

Figure 5:
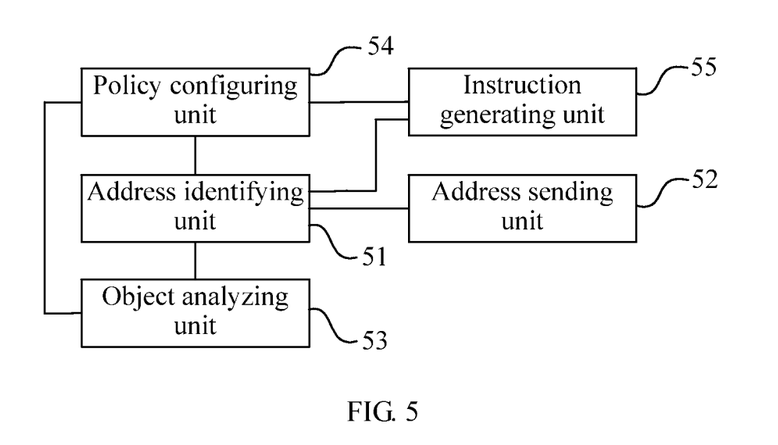
FIG. 5 is schematic structural diagram of a host according to an embodiment of the present invention.

FIG. 5 is a schematic structural diagram of a host according to an embodiment of the present invention. The host can perform a method for controlling quality of service of a storage system according to any embodiment of the present invention. This embodiment only describes a structure of the host briefly. For the specific working principle of the host, reference may be made to the descriptions of the method embodiments of the present invention.

As shown in FIG. 5, the host may include: an address identifying unit 51 and an address sending unit 52. The address identifying unit 51 is configured to acquire a preset data object, and acquire a storage address, in a storage device, corresponding to the data object according to the preset data object, where the data object includes an application program or a file, and the acquiring the storage address, in the storage device, corresponding to the data object includes: acquiring the storage address, in the storage device, corresponding to the data object stored in a file system by searching the file system. The address sending unit 52 is configured to send the storage address to the storage device, so that the storage device performs quality of service control on access to the storage address.

Further, the host may also include an object analyzing unit 53, configured to monitor access to a plurality of data objects in the file system, and acquire a data object of which an access frequency reaches a preset value as a hot data object. Correspondingly, the address identifying unit 51 is specifically configured to acquire a storage address, in the storage device, corresponding to the hot data object.

Further, the address identifying unit 51 is further configured to: when a storage attribute of the data object is changed, acquire a changed storage address, in the storage device, corresponding to the data object, and send the changed storage address to the storage device, where the storage attribute includes a data amount or a data position included in the data object.

Further, the host may also include: a policy configuring unit 54 and an instruction generating unit 55. The policy configuring unit 54 is configured to acquire a preset quality of service control policy corresponding to the data object. The instruction generating unit 55 is configured to obtain: according to the storage address and the quality of service control policy, a quality of service control instruction and send the quality of service control instruction to the storage device, so that the storage device performs, according to the quality of service control instruction, the quality of service control on the access to the storage address.

By configuring the address identifying unit, the address sending unit, and so on, the host of this embodiment acquires the storage address, in the storage device, corresponding to the data object, so that the storage device performs the QoS control on the access to the storage address only, but does not need to perform control on the whole LUN, which is unlike the prior art, thereby solving the problems of resource waste and lower quality of service in a QoS control manner, saving system resources of the storage system, improving the quality of service of the storage system, and satisfying user requirements more accurately.

Embodiment 5

Figure 6:
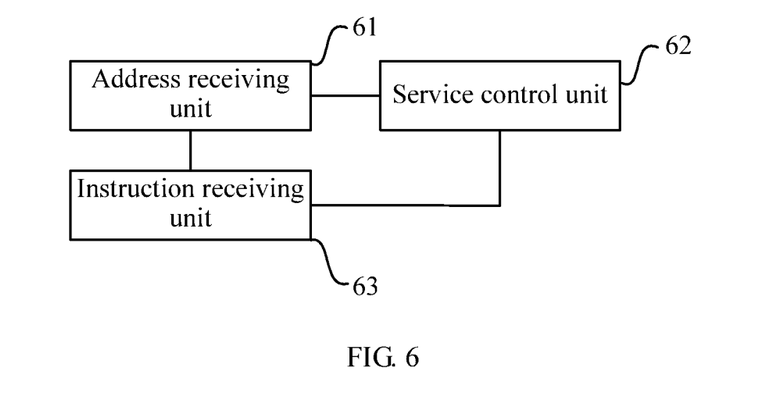
FIG. 6 is schematic structural diagram of a storage device according to an embodiment of the present invention.

FIG. 6 is a schematic structural diagram of a storage device according to an embodiment of the present invention. The storage device may execute a method for controlling quality of service control according to any embodiment of the present invention. This embodiment only describes a structure of the storage device briefly. For the specific working principle of the storage device, reference may be made to the descriptions of the method embodiments of the present invention.

As shown in FIG. 6, the storage device may include: an address receiving unit 61 and a service control unit 62. The address receiving unit 61 is configured to receive a storage address, corresponding to a preset data object, sent by a host. The service control unit 62 is configured to perform quality of service control on access to the storage address.

Further, the storage device also includes an instruction receiving unit 63, configured to receive a quality of service control instruction sent by the host, where the quality of service control instruction is obtained by the host according to the storage address and a preset quality of service control policy. Correspondingly, the service control unit 62 is specifically configured to perform, according to the quality of service control instruction, the quality of service control on the access to the storage address.

By configuring the address receiving unit, the service control unit and so on, the storage device of this embodiment receives the storage address, in the storage device, corresponding to the data object, so that the storage device performs the QoS control on the access to the storage address only, but does not need to perform control on the whole LUN, which is unlike the prior art, thereby solving the problems of resource waste and lower quality of service in a QoS control manner, saving the system resources of the storage system, improving the quality of service of the storage system, and satisfying user requirements more accurately.

Embodiment 6

Figure 7:
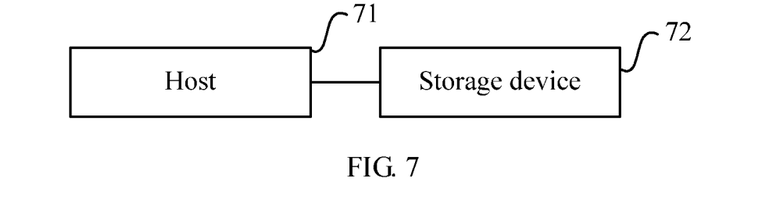
FIG. 7 is a schematic structural diagram of a system for controlling quality of service of a storage system according to an embodiment of the present invention.

FIG. 7 is a schematic structural diagram of a system for controlling quality of service of a storage system according to an embodiment of the present invention. The control system may execute a method for controlling quality of service of a storage system according to any embodiment of the present invention. This embodiment only describes a structure of the system briefly. For the specific working principle, reference may be made to the descriptions of the method embodiments of the present invention.

As shown in FIG. 7, the system for controlling the quality of service of the storage system may include a host 71 and a storage device 72. The host 71 is configured to acquire a preset data object, acquire a storage address, in the storage device, corresponding to the data object according to the preset data object, and send the storage address to the storage device, where the data object includes an application program or a file, and the acquiring the storage address, in the storage device, corresponding to the data object includes: acquiring the storage address, in the storage device, corresponding to the data object stored in a file system by searching the file system. The storage device 72 is configured to perform quality of service control on access to the storage address.

Further, the host 71 is further configured to send a quality of service control instruction corresponding to the data object to the storage device, where the quality of service control instruction is obtained by the host according to the storage address and a preset quality of service control policy corresponding to the data object. Correspondingly, the storage device 72 is further configured to perform, according to the quality of service control instruction, the quality of service control on the access to the storage address.

In the system for controlling the quality of service of the storage system of this embodiment, the host acquires the storage address, in the storage device, corresponding to the data object, and the storage device performs the QoS control on the access to the storage address only, but does not need to perform control on the whole LUN, which is unlike the prior art, thereby solving the problems of resource waste and lower quality of service in a QoS control manner, saving system resources of the storage system, improving the quality of service of the storage system, and satisfying user requirements more accurately.

Persons of ordinary skill in the art may understand that all or part of steps of the method in the embodiments may be implemented by a program instructing relevant hardware. The program may be stored in a computer readable hardware. When the program is performed, the steps of the method in the embodiments are performed. The storage medium may be any medium that is capable of storing program codes, such as an ROM, an RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understood that they may still make modifications to the technical solutions described in the foregoing embodiments, or make equivalent replacements to some technical features thereof, without departing from the spirit and scope of the technical solutions of the embodiments of the present invention.

What is claimed is:

1. A method for a host of a storage system to control quality of service of data objects stored in the storage system, comprising:
   identifying, by the host, a target data object as a result of access frequency monitoring by the host;
   acquiring, by the host, a storage address of the target data object stored in a storage device of the storage system by searching a file system of the host, wherein the file system contains data mapping the target data object to the storage address of the target data object, wherein the storage device is connected to the host and independent from the host; and
   sending, by the host, a quality of service (QoS) instruction to the storage device including a logic unit (LU) having a storage space, wherein the QoS instruction includes the storage address that identifies a part of the storage space of the LU, and wherein the QoS instruction contains an object access performance target;
   performing, by the storage device, quality of service control on access to the target data object at the storage address, rather than performing quality of service control on the LU;
   wherein the step of performing quality of service control comprises the storage device continuously adjusts up to a predefined threshold, a system resource for quality of service control on a future I/O processing of an I/O request at the storage address, according to the object access performance target based on the storage device monitoring of the access to the target data object, when the future I/O processing of the I/O request is received, wherein the system resource includes at least one of: an I/O priority, cache resource, queue depth, number of queues and a concurrency level.

2. The method according to claim 1, wherein the step of identifying a target data object includes:
   monitoring, by the host, access frequencies of data objects in the file system, and identifying, by the host, the target data object when an access frequency of a data object of the data objects in the file system reaches a preset value.

3. The method according to claim 1, further comprising:
   acquiring, by the host, a quality of service control policy corresponding to the target data object; and
   generating, by the host, the quality of service instruction according to the storage address and the quality of service control policy.

4. The method according to claim 1, further comprising:
   acquiring, by the host, a changed storage address of the target data object stored in the storage device by searching the file system, when a storage attribute of the target data object is changed; and sending, by the host, the changed storage address to the storage device to instruct the storage device to perform quality of service control on access to the target data object at the changed storage address.

5. A storage system, comprising:

a host having a host processor and a host non-transitory computer-readable storage medium including computer-executable instructions for execution by the host processor; and a storage device connected to the host and independent from the host, the storage device having a storage processor and a storage device non-transitory computer-readable storage medium including computer-executable instructions for execution by the storage processor;

wherein the host storage medium includes instructions to identify a target data object as a result of access frequency monitoring by the host acquire a storage address of the target data object stored in a storage device by searching a file system of the host, wherein the file system contains data mapping the target data object to the storage address of the target data object; and send a quality of service (QoS) instruction to the storage device to instruct the storage device to perform quality of service control on access to the target data object at the storage address, wherein the storage device includes a logic unit (LU) having a storage space, and wherein the QoS instruction includes the storage address which identifies a part of the storage space of the LU, and wherein the QoS instruction contains an object access performance target; and wherein storage device storage medium includes instructions to perform quality of service control on access to the target data object at the storage address, rather than performing quality of service control on the LU; wherein performing quality of service control on access to the target data object at the storage address comprises adjusting up to a predefined threshold, a system resource for quality of service control on a future I/O processing of an I/O request at the storage address, according to the object access performance target based on the storage device monitoring of the access to the target data object, when the future I/O processing of the I/O request is received, wherein the system resource includes at least one of: an I/O priority, cache resource, queue depth, number of queues and a concurrency level.

6. The system according to claim 5, wherein the host is configured to monitor access frequencies of data objects in the file system, and identify the target data object of when an access frequency of a data object of the data objects in the file system reaches a preset value.

7. The system according to claim 5, wherein the host is further configured to acquire a quality of service control policy corresponding to the target data object; and generate the quality of service instruction according to the storage address and the quality of service control policy.

8. The system according to claim 5, wherein the host is further configured to acquire a changed storage address of the target data object stored in the storage device by searching the file system, when a storage attribute of the data object is changed, and send the changed storage address to the storage device to instruct the storage device to perform quality of service control on access to the target data object at changed storage address.

* * * * *